United States Patent
Manbert et al.

(10) Patent No.: US 7,370,172 B2
(45) Date of Patent: *May 6, 2008

(54) METHOD AND SYSTEM FOR STRATEGY DRIVEN PROVISIONING OF STORAGE IN A STORAGE AREA NETWORK

(75) Inventors: Rush Manbert, San Jose, CA (US); Dipam Patel, Fremont, CA (US); Chandra Prasad, Los Altos, CA (US)

(73) Assignee: NetApp, Inc., Sunnyvale, CA (US)

(*) Notice: Subject to any disclaimer, the term of this patent is extended or adjusted under 35 U.S.C. 154(b) by 9 days.

This patent is subject to a terminal disclaimer.

(21) Appl. No.: 11/421,470

(22) Filed: May 31, 2006

(65) Prior Publication Data

US 2006/0206682 A1    Sep. 14, 2006

Related U.S. Application Data

(63) Continuation of application No. 10/696,434, filed on Oct. 28, 2003, now Pat. No. 7,080,229.

(60) Provisional application No. 60/422,109, filed on Oct. 28, 2002.

(51) Int. Cl.
*G06F 12/02* (2006.01)

(52) U.S. Cl. ........................................ 711/170

(58) Field of Classification Search ............... 711/170, 711/171, 172, 173
See application file for complete search history.

(56) References Cited

U.S. PATENT DOCUMENTS

| | | | | |
|---|---|---|---|---|
| 2002/0174306 A1* | 11/2002 | Gajjar et al. | ................. | 711/148 |
| 2002/0188697 A1* | 12/2002 | O'Connor | ................... | 709/219 |
| 2004/0230317 A1* | 11/2004 | Kumar et al. | ................... | 700/1 |
| 2005/0027754 A1* | 2/2005 | Gajjar et al. | ................. | 707/200 |
| 2005/0091215 A1* | 4/2005 | Chandra et al. | ................ | 707/10 |

* cited by examiner

*Primary Examiner*—Kevin L. Ellis
(74) *Attorney, Agent, or Firm*—Wiesner and Associates; Leland Wiesner

(57) ABSTRACT

A method and system for provisioning storage from a storage area network is provided. The provisioning includes receiving a request for a storage size and storage configuration from a storage area network according to a storage profile, identifying a storage device pool of storage devices according to a storage device candidate strategy, selecting a media unit provisioning strategy based upon the type of storage configuration specified in the storage request, generating media unit solutions using the media unit provisioning strategy and sequence of storage devices in the storage pool, determining if the media unit provisioning strategy produced a solution for the requested storage configuration and provisioning a media unit solution in response to the determination.

27 Claims, 8 Drawing Sheets

METHOD AND SYSTEM FOR STRATEGY DRIVEN PROVISIONING OF STORAGE IN A STORAGE AREA NETWORK

CROSS-REFERENCE TO RELATED APPLICATIONS

This application claims priority to U.S. Provisional Application No. 60/422,109, filed Oct. 28, 2002 and titled "Apparatus and Method for Enhancing Storage Processing in a Network-Based Storage Virtualization System", which is incorporated herein by reference and is a continuation under 35 USC 120 of U.S. application Ser. No. 10/696,434, filed Oct. 28, 2003 now U.S. Pat. No. 7,080,229 and titled "METHOD AND SYSTEM FOR STRATEGY DRIVEN PROVISIONING OF STORAGE IN A STORAGE AREA NETWORK", by Rush Manbert, Dipam Patel and Chandra Prasad and assigned to the assignee of the present invention. This application also relates to the subject matter disclosed in the co-pending U.S. application Ser. No. 10/695,887, by Richard Meyer, et al., titled "Method and System for Dynamic Expansion and Contraction of Nodes in a Storage Area Network", co-pending U.S. application Ser. No. 10/695,889 by Gautam Ghose, et al., titled "Failure Analysis Method and System for Storage Area Networks" and co-pending U.S. application Ser. No. 10/695,888, by Tuan Nguyen, et al., titled "Method and System for Managing Time-Out Events in a Storage Area Network".

BACKGROUND OF THE INVENTION

Storage area networks, also known as SANs, facilitate sharing of storage devices with one or more different host server computer systems and applications. Fibre channel switches (FCSs) can connect host servers with storage devices creating a high speed switching fabric. Requests to access data pass over this switching fabric and onto the correct storage devices through logic built into the FCS devices. Host servers connected to the switching fabric can quickly and efficiently share blocks of data stored on the various storage devices connected to the switching fabric.

Storage devices can share their storage resources over the switching fabric using several different techniques. For example, storage resources can be shared using storage controllers that perform storage virtualization. This technique can make one or more physical storage devices, such as disks, which comprise a number of logical units (sometimes referred to as "physical LUNs") appear as a single virtual logical unit or multiple virtual logical units, also known as VLUNs. By hiding the details of the numerous physical storage devices, a storage virtualization system having one or more such controllers advantageously simplifies storage management between a host and the storage devices. In particular, the technique enables centralized management and maintenance of the storage devices without involvement from the host server.

In many instances it is advantageous to place the storage virtualization controller(s) in the middle of the fabric, with the host servers and controllers arranged at the outer edges of the fabric. Such an arrangement is generally referred to as a symmetric, in-band, or in-the-data-path configuration. It is often the case that many different components distributed over the storage area network operate together to fulfill a particular request and deliver the storage. Generally, these components can deliver requested data or data processing results within a time frame unless an error or other malfunction has occurred. Accordingly, many processes operating with the storage network have a time out interval that the process needs to complete the operation or receive a time out event. This time out event is used to indicate that the event on the storage network has failed and needs to be restarted or investigated.

During operation, the storage virtualization controller receives requests from applications, users and other systems for different amounts of storage from the storage area network. The storage virtualization controller identifies one or more storage devices on the storage network to fulfill each request and delivers the storage as a VLUN. The application, user or other systems use the VLUN to access and use the storage on the storage area network in the same way as other types of storage. As previously described, the VLUN hides the details of the underlying complex storage area network and simplifies administration of complex storage systems.

Unfortunately, identifying and allocating storage from the storage area network in an efficient and cost-effective manner is a complex and difficult process. The storage virtualization controller needs to manage a larger number of storage devices having different operating characteristics and available storage sizes. For any given storage request, the controller may need to determine the most optimal allocation to use given there may be many different ways to allocate the storage. In some cases, the storage allocation may be more cost effective yet not provide the level of reliability a user has required. Alternatively, other storage allocations may provide the requested reliability but not use the storage resources efficiently and in a cost-effective manner for the storage area network operator. Conventional approaches to provisioning storage may perform many thousands of computations to find a provisioning solution. These "brute force" approaches to provisioning may identify a reasonable solution yet the large computational requirements make them unacceptably slow for use in most applications.

For these and other reasons, it is therefore desirable to create a system that provisions storage on a storage area network in a manner that utilizes storage efficiently yet performs the provisioning operation in a relatively short time frame.

BRIEF DESCRIPTION OF THE DRAWINGS

The features of the present invention and the manner of attaining them, and the invention itself, will be best understood by reference to the following detailed description of embodiments of the invention, taken in conjunction with the accompanying drawings, wherein.

SUMMARY OF THE INVENTION

In one implementation, the present invention provides a method of provisioning storage from a storage area network. The provisioning operation includes receiving a request for a storage size and storage configuration from a storage area network according to a storage profile, identifying a storage device pool of storage devices according to a storage device candidate strategy, selecting a media unit provisioning strategy based upon the type of storage configuration specified in the storage request, generating media unit solutions using the media unit provisioning strategy and sequence of storage devices in the storage pool, determining if the media unit provisioning strategy produced a solution for the requested storage configuration and provisioning a media unit solution in response to the determination.

DETAILED DESCRIPTION

Aspects of the present invention provide a strategy driven method and system for storage provisioning in large scale storage area networks. Unlike conventional approaches, provisioning done with the present invention provides storage efficiently and without excessive delay; even taking into account particular storage requirements specified in a particular storage profile. Provisioning is done based on heuristics to reduce the time delay required for finding solutions. The storage profile ensures that the solutions generated are both reasonable in terms of cost-effectiveness as well as meeting the particular storage requirements.

The reduced time delay in finding solutions allows for the consideration of many more solutions. Multiple provisioning solutions can be generated and considered by the user or the system without actually committing resources. This helps manage storage resources more effectively as the relative value of different configurations are considered before expending administrative time actually configuring the system. Compared with conventional approaches, administrative time used to manage the storage area network is also reduced as there is no time spent reversing inappropriate provisions of storage from the storage area network.

Implementations of the present invention are also advantageous as the provisioning approach is driven by one or more replaceable strategies. By implementing these strategies in a hierarchical manner, a combination of strategies can be selected and tailored to fit the needs of many different users on the storage area network. These strategies used to drive the provisioning process are also advantageous as they do not require rewriting of the system. For example, an object oriented implementation of the present invention allows many of the strategies to be specified and/or changed in accordance with object-oriented principles of reusability and software engineering design.

Figure 1:
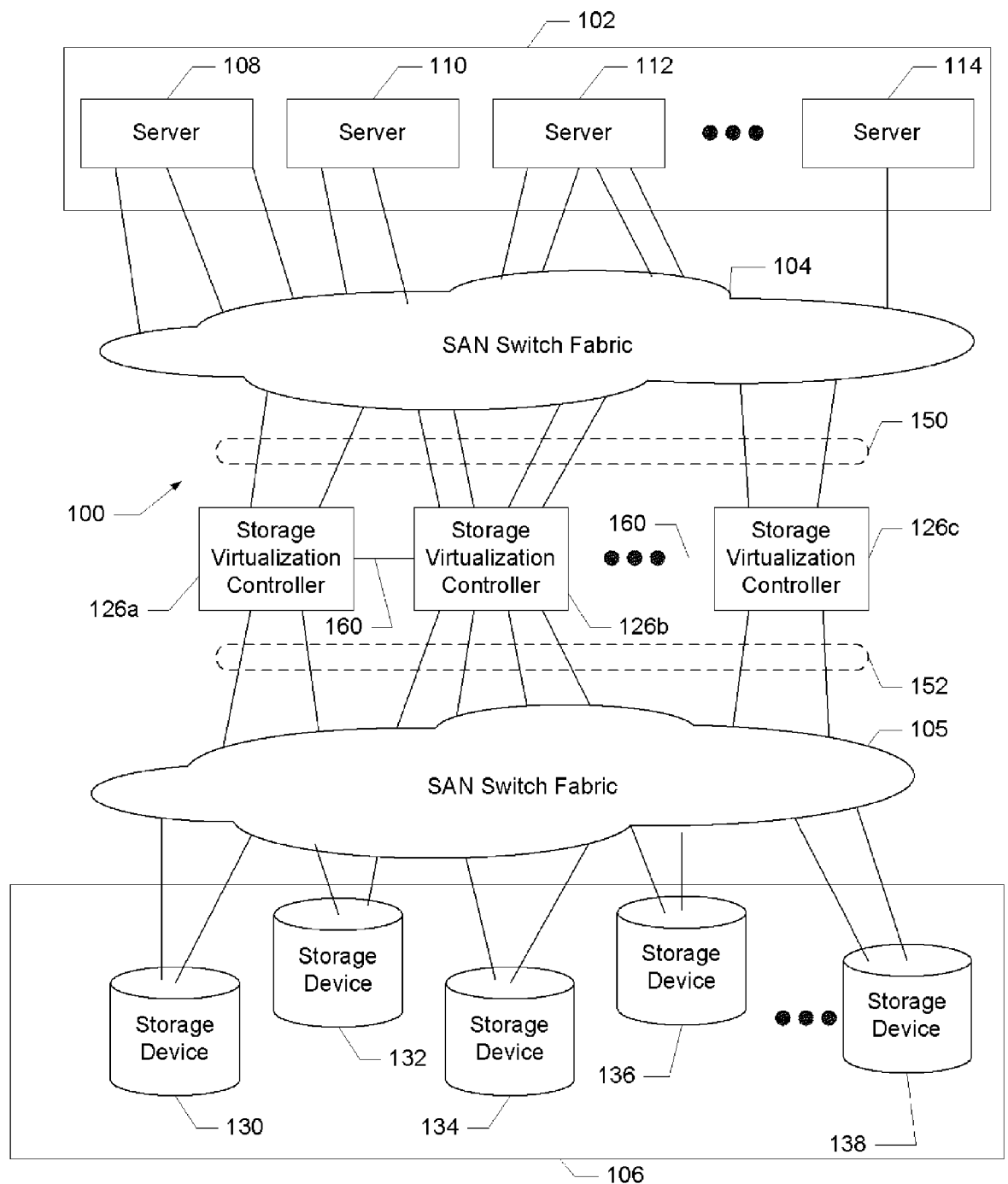
FIG. 1 is an exemplary system block diagram of the logical relationship between host servers, storage devices, and a storage area network (SAN) implemented using a switching fabric along with an embodiment of the present invention.

Referring to the exemplary configuration in FIG. 1, a storage area network (SAN) 100 may include one or more SAN switch fabrics, such as fabrics 104,105. Fabric 104 is connected to hosts 102, while fabric 105 is connected to storage devices 106. At least one storage virtualization controller 126 is inserted in the midst of SAN 100, and connected to both fabrics 104,105 to form a symmetric, in-band storage virtualization configuration. In an in-band configuration, communications between server devices 102 and storage devices 106 pass through controller 126 for performing data transfer in accordance with the present invention.

Host servers 102 are generally communicatively coupled (through fabric 104) via links 150 to individual upstream processing elements (UPE) of controller 126. In an alternate configuration, one or more host servers may be directly coupled to controller 126, instead of through fabric 104. Controller 126 includes at least one UPE for each server 102 (such as host servers 108,110,112,114) connected to the controller 126. As will be discussed subsequently in greater detail, storage virtualization controller 126 appears as a virtual logical unit (VLUN) to each host server.

Storage devices 106 are communicatively coupled (through fabric 105) via links 152 to individual downstream processing elements (DPEs) of controller 126. In an alternate configuration, one or more storage devices may be directly coupled to controller 126, instead of through fabric 105. Controller 126 includes at least one DPE for each storage device 106 (such as storage devices 130,132,134, 136,138) connected to the controller 126. Controller 126 appears as an initiator to each storage device 106. Multiple controllers 126 may be interconnected by external communications link 160. Within each controller 126 are storage provisioning modules designed in accordance with the present invention along with supporting hardware and software needed to implement the present invention. As described later herein, these storage provisioning modules provide efficient and rapid provisioning of storage using a variety of different modular strategies.

Figure 2:
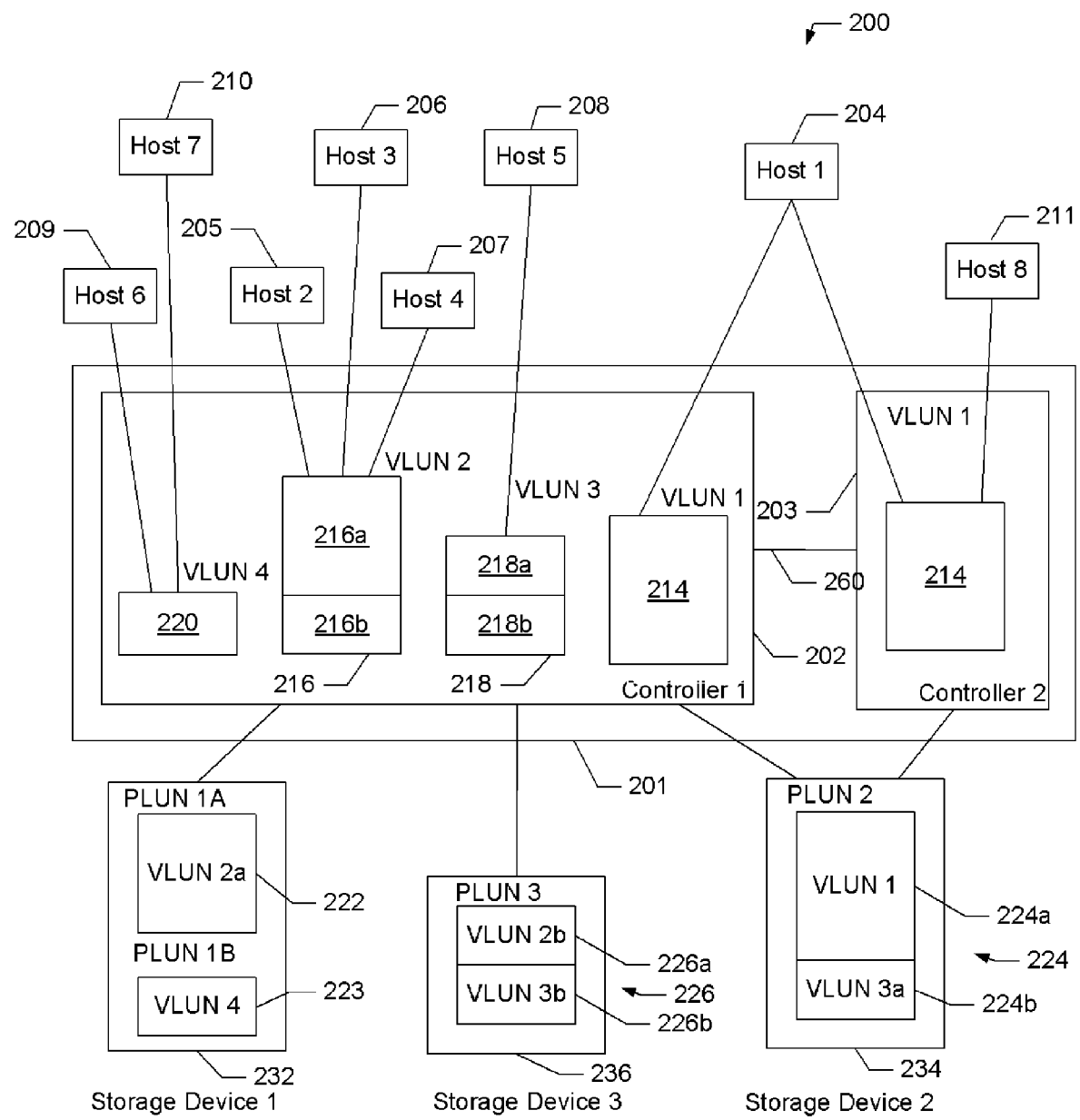
FIG. 2 is an exemplary system block diagram illustrative of the relationship provided by a storage virtualization controller between virtual logical units and logical units on physical storage devices, in accordance with an embodiment of the present invention.

Considering now the virtualization of storage provided by an embodiment of the present invention, and with reference to the exemplary SAN 200 of FIG. 2, a storage virtualization system includes an exemplary storage virtualization controller arrangement 201. Controller arrangement 201 includes, for illustrative purposes, two storage virtualization controllers 202,203 interconnected via communication link 260. Controller1 202 has been configured to provide four virtual logical units 214,216,218,220 associated with hosts 204-210, while controller2 203 has been configured to provide one virtual logical unit 214 associated with hosts 204,211. In the general case, a virtual logical unit (VLUN) includes data from M physical storage devices, where the data corresponds to a range of data blocks.

In operation, one or more hosts each request access to a VLUN having a particular number of bytes of data using storage devices substantially matching characteristics described in a storage profile. Each of host 204-211 accesses it's associated VLUN by sending commands to the controller 201 or controller 2 203 to read and write virtual data blocks in the VLUN. In accordance with one implementation of the present invention, controller1 202 of this exemplary configuration associates host1 204 with VLUN1 214;

associates host2 205, host3 206, and host4 207 with VLUN2 216; associates host5 208 with VLUN3 218, and associates host7 210 and host6 209 with VLUN4 220. In addition, controller2 203 associates host1 204 and host8 211 with VLUN1 214. It can be seen that host1 204 can access VLUN1 214 through two separate paths, one through controller1 202 and one path through controller2 203.

Controller arrangement 201 maps the virtual data blocks to physical data blocks on individual ones of the storage devices 232,234,236, according to one or more provisioning operations consistent with implementations of the present invention. Once provisioned, controller arrangement 201 communicates the commands and transfers the data blocks to and from the appropriate ones of the storage devices 232,234,236. Each storage device 232,234,236 can include one or more physical LUNs; for example, storage device 1 232 has two physical LUNs, PLUN 1A 222 and PLUN 1B 223.

To illustrate further the mapping of virtual data blocks to physical data blocks, all the virtual data blocks of VLUN1 214 are mapped to a portion 224*a* of the physical data blocks PLUN2 224 of storage device 234. Since VLUN2 216 requires more physical data blocks than any individual storage device 232,234,236 has available, one portion 216*a* of VLUN2 216 is mapped to the physical data blocks of PLUN 1A 222 of storage device 232, and the remaining portion 216*b* of VLUN2 216 is mapped to a portion 226*a* of the physical data blocks of PLUN3 226 of storage device 236. One portion 218*a* of VLUN3 218 is mapped to a portion 224*b* of PLUN2 224 of storage device 234, and the other portion 218*b* of VLUN3 218 is mapped to a portion 226*b* of PLUN3 226 of storage device 236. It can be seen with regard to VLUN3 that such a mapping arrangement allows data block fragments of various storage devices to be grouped together into a VLUN, thus advantageously maximizing utilization of the physical data blocks of the storage devices. All the data blocks of VLUN4 220 are mapped to PLUN1B 223 of storage device 232.

While the above-described exemplary mapping illustrates the concatenation of data block segments on multiple storage devices into a single VLUN, it should be noted that other mapping schemes, including but not limited to striping and replication, can also be utilized by the controller arrangement 201 to form a VLUN. Additionally, the storage devices 232,234,236 may be heterogeneous; that is, they may be from different manufacturers or of different models, and may have different storage sizes, capabilities, architectures, and the like. Similarly, the hosts 204-210 may also be heterogeneous; they may be from different manufacturers or of different models, and may have different processors, operating systems, networking software, applications software, capabilities, architectures, and the like.

It can be seen from the above-described exemplary mapping arrangement that different VLUNs may contend for access to the same storage device. For example, VLUN2 216 and VLUN4 220 may contend for access to storage device 1 232; VLUN1 214 and VLUN3 218 may contend for access to storage device 2 234; and VLUN2 216 and VLUN3 218 may contend for access to storage device 3 236. The storage virtualization controller arrangement 201 according to an embodiment of the present invention not only provisions storage but also maps and resolves access contention, while allowing data transfers between the host and the storage device to occur at wire-speed.

Before considering the various elements of the storage virtualization system in detail, it is useful to discuss, with reference to FIGS. 1 and 2, the format and protocol of the storage requests that are sent over SAN 200 from a host to a storage device through the controller arrangement 201. Many storage devices frequently utilize the Small Computer System Interface (SCSI) protocol to read and write the bytes, blocks, frames, and other organizational data structures used for storing and retrieving information. Hosts access a VLUN using these storage devices via some embodiment of SCSI commands; for example, layer 4 of Fibre Channel protocol. However, it should be noted that the present invention is not limited to storage devices or network commands that use SCSI protocol.

Storage requests may include command frames, data frames, and status frames. The controller arrangement 201 processes command frames only from hosts, although it may send command frames to storage devices as part of processing the command from the host. A storage device generally does not send command frames to the controller arrangement 201, but instead sends data and status frames. A data frame can come from either host (in case of a write operation) or the storage device (in case of a read operation).

In many cases one or more command frames is followed by a large number of d a t a frames. Command frames for read and write operations include an identifier that indicates the VLUN that data will be read from or written to. A command frame containing a request, for example, to read or write a 50 kB block of data from or to a particular VLUN may then be followed by 25 continuously-received data frames each containing 2 kB of the data. Since data frames start coming into controller 203 only after the controller has processed the command frame and sent a go-ahead indicator to the host or storage device that is the originator of the data frames, there is no danger of data loss or exponential delay growth if the processing of a command frame is not done at wire-speed; the host or the storage device will not send more frames until the go-ahead is received. However, data frames flow into controller 203 continuously once the controller gives the go-ahead. If a data frame is not processed completely before the next one comes in, the queuing delays will grow continuously, consuming buffers and other resources. In the worst case, the system could run out of resources if heavy traffic persists for some time.

Figure 3A:
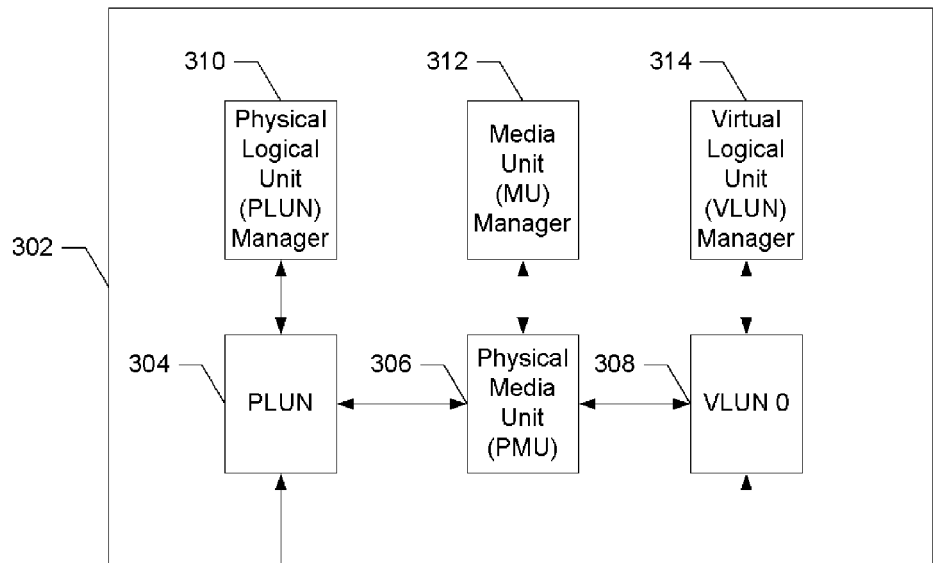
FIG. 3A is a block diagram schematic of a controller with storage device mapping in accordance with one implementation of the present invention.

Referring now to FIG. 3A is a block diagram schematic of a controller 302 with storage device mapping in accordance with one implementation of the present invention. In this example, controller 302 illustrates a physical logical unit (PLUN) manager 310, a media unit (MU) manager 312 and a virtual logical unit (VLUN) manager 314 and the corresponding and respective PLUN 304, physical MU (PMU) 306 and VLUN 308 that they provision and control.

Different aspects of the present invention implemented in these various manager components work together to provision storage in accordance with implementations of the present invention. PLUN manager 310 manages data and command transfer to and from storage devices associated with one or more PLUN 304. Each storage device typically is associated with at least one PLUN used for identifying the storage device during provisioning and other operations of the storage area network.

VLUN Manager 314 manages data and command transfer to and from host computers. As previously illustrated, each host computer can be associated with one or more VLUNs representing a virtual storage space on the storage area network provisioned from one or more storage devices by the present invention. Once allocated, a particular VLUN represents a certain storage size implemented using underlying storage devices having qualities defined in the storage profile (i.e., performance parameters, reliability, communication paths, manufacturer and other parameters).

Media unit manager 312 translates information and data flowing between VLUNs and PLUNs previously described. In effect, media unit manager 312 uses an abstract block-access layer that allowing the related address spaces to be treated in a logical manner regardless of the underlying storage device constructs or physical logical units (PLUN). For example, media unit manager 312 manages address device constructions in PLUN 304 and the corresponding storage devices through the combination of one or more physical media units or MU. To satisfy different requested sizes of data, media unit manager 312 arranges MU of storage into slices, concatenations, stripes (RAID-n) and mirrors (RAID-1). Used in combination with one or more VLUNs, the logical address spaces can be configured to appear in different configurations including a multi-ported storage device. This process of presenting physical LUNs as logical address spaces on a virtual storage device is referred to as storage virtualization.

Figure 3B:
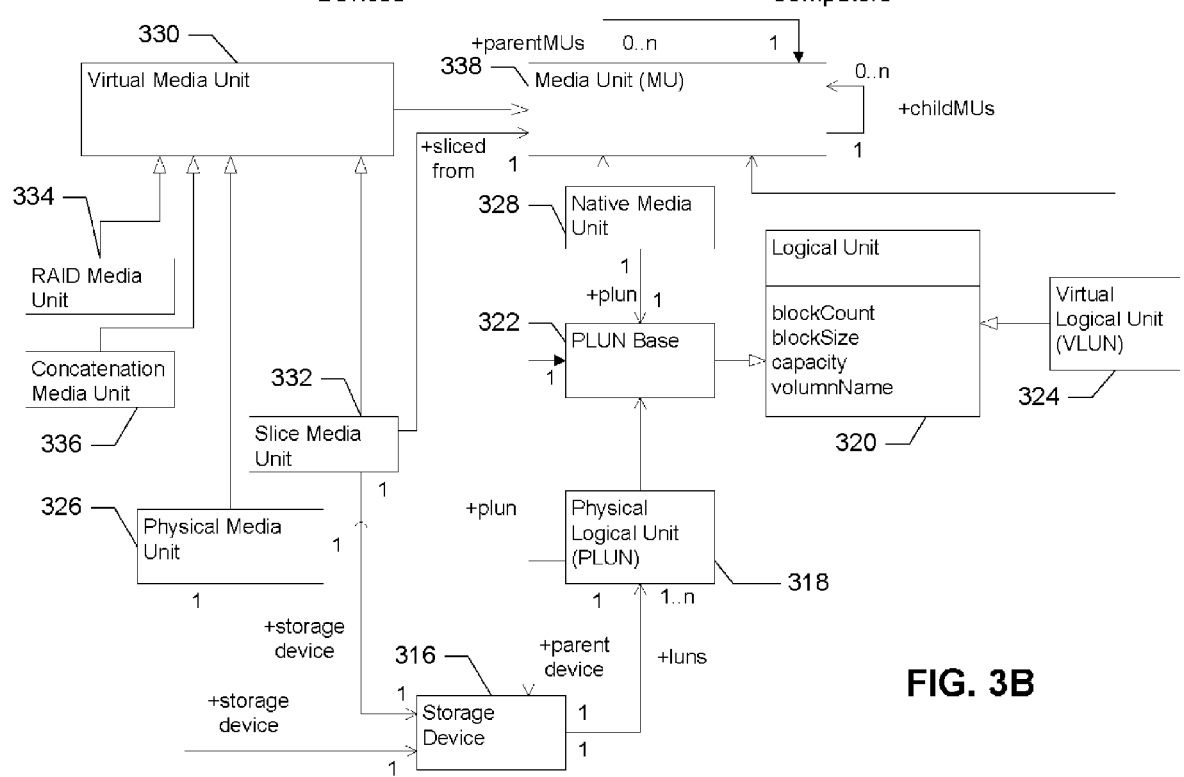
FIG. 3B is a block diagram schematic of various media units and underlying constructs used in conjunction with one implementation of the present invention.

Referring now to FIG. 3B is a block diagram schematic of various media units and underlying constructs used in conjunction with one implementation of the present invention. This illustration uses unified modeling language (UML) notation to facilitate one implementation of the invention in an object oriented language yet non-object oriented implementations can use the underlying information in this example as well. This illustration includes a storage device 316, a physical logical unit (PLUN) 318, a logical unit 320, a PLUN base 322, a virtual logical unit (VLUN) 324, a physical media unit 326, a native media unit 328, a virtual media unit 330, a slice media unit 332, a RAID media unit 334, concatenation media unit 336 and a media unit 338.

Each storage device 316 "owns" one or more PLUNs 318. The inheritance for PLUN 318 passes through a base class of PLUN Base 322 as the PLUNs are a type of LUN 320. In this case, PLUN Base 322 is a virtual base class and does not get directly instantiated without specifying related subtypes. Accordingly, the association with storage device 316 is through PLUN 318. Similarly, Physical Media Units 326 and Native Media Units 328 also provide access to base class PLUN Base 322.

Media unit 338 includes two subtypes that describe a media unit in different states: Native Media Unit 328 represents PLUNs in their "native" state rather than the virtual pool and are not yet available for provisioning; Virtual Media Unit 330 is a base class representing PLUNs entered into the virtual pool and available for provisioning using a combination of one or more media unit implementations.

Media unit implementations of the base class virtual media unit 330 include: RAID media unit 334, concatenation media unit 336, physical media unit 326, and slice media unit 332. Of the Virtual Media Unit 330 implementations, only Physical Media Unit 326 and Slice Media Unit 332 carry an association to one Storage Device 316. Implementations of the present invention use this relationship to provision storage on a single storage device while using the media unit abstraction layer. Other media unit types like RAID media unit 334 and concatenation media unit 336 may be associated with more than one storage device.

Figure 4:
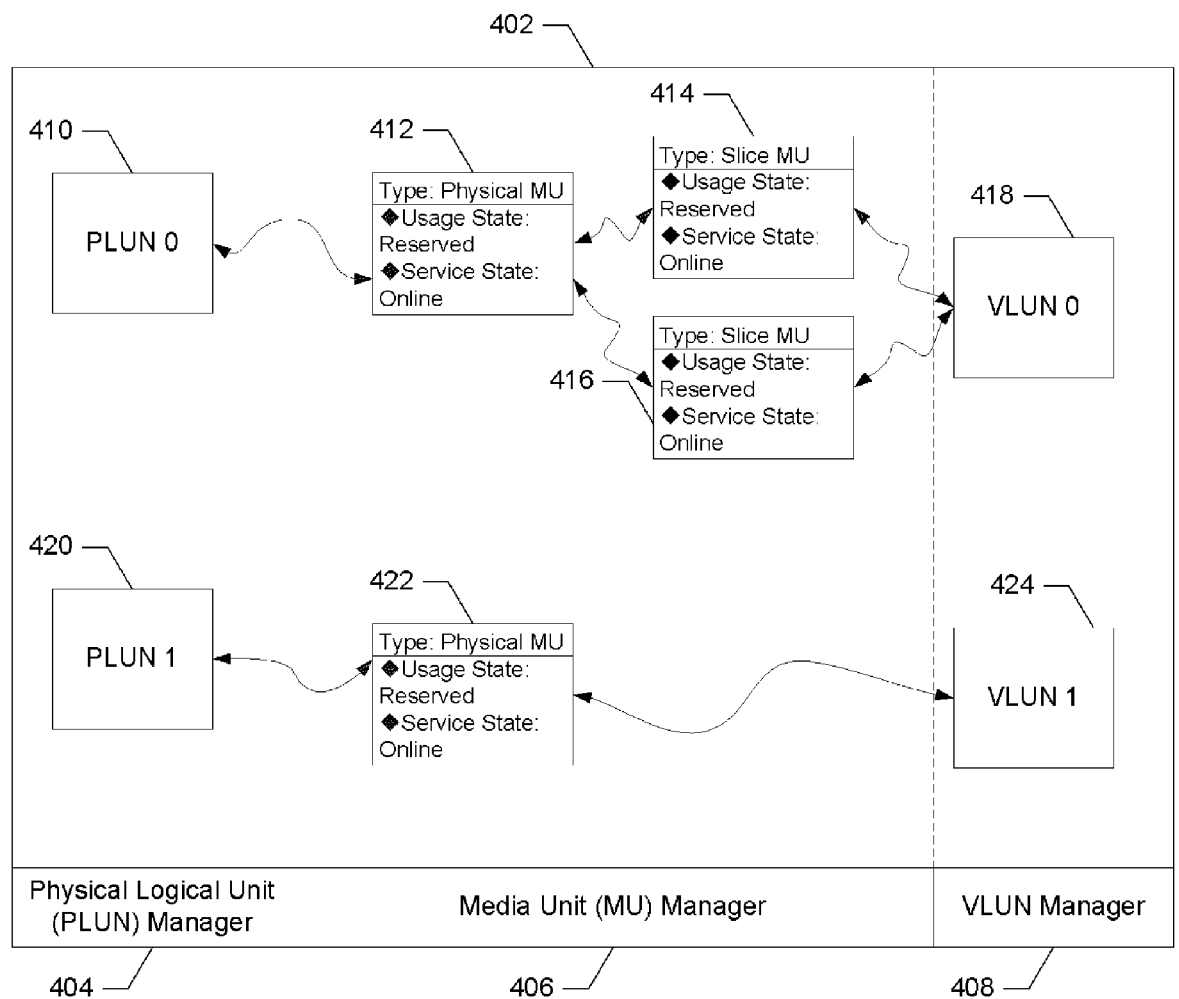
FIG. 4 is a block diagram illustration of media units considered for provisioning in accordance with one implementation of the present invention.

FIG. 4 is a block diagram illustration of media units considered for provisioning in accordance with one implementation of the present invention. In one implementation of the present invention, only unused slice media units and unused physical media units (PMU) are considered during the provisioning process. Selection of these particular media units is part of the heuristic used to reduce the complexity of provisioning and improve the performance for rapid evaluation of many different possible solutions. As needed, an alternate implementation of the present invention could also use media units based upon concatenations and slices of concatenations if necessary.

In this example, media unit manager 406 derives both slice MU 414 and slice MU 416 from a physical MU 412 which in turn is an abstraction of the underlying PLUN 0 410. As a result of the provisioning operation of the present invention, VLUN manager 408 assigns slice MU 414 and slice MU 416 to VLUN 0 418 as illustrated in the FIG. 4. Similarly, media unit manager 406 uses PMU 422 as an abstraction to access all of underlying PLUN 1 420 managed by PLUN manager 404. VLUN 1 424 resulting from the provisioning in turn has complete access to physical MU 422 and PLUN 1 420 by way of VLUN manager 408.

Figure 5:
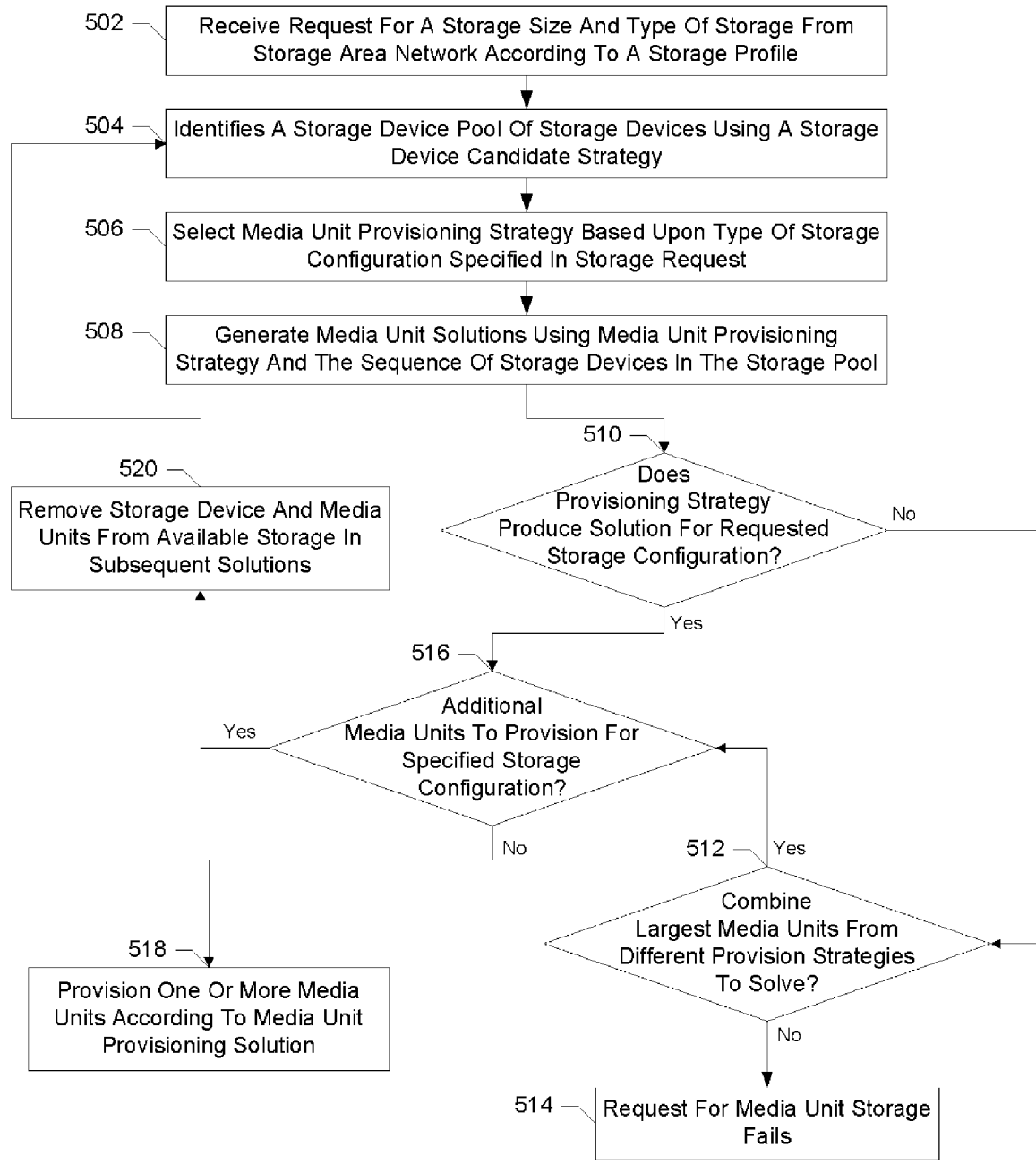
FIG. 5 is a flowchart diagram that provides the operations for provisioning storage through the controller in accordance with one implementation of the present invention.

Referring to FIG. 5, a flowchart diagram provides the operations for provisioning storage through the controller in accordance with one implementation of the present invention. Initially, a host requests a storage size and type of storage from storage area network according to a storage profile (502). The host has the option of requesting a desired storage size and a tolerance for accepting more or less of desired storage size from the SAN. Further, the type of storage can also be specified as being of type RAID, stripe, replication storage or a single physical unit storage type; default storage type is a single physical storage type in one implementation. Desired storage type designations or configurations assist the provisioning heuristics of the present invention to identify and provision the proper storage from the SAN. For example, the storage type designation of a RAID indicates to the heuristics of the present invention to provision and configure the data in a RAID type configuration for a VLUN accessed by the host.

As will be further described later herein, the storage profile is used to assist in selection and provisioning of the underlying storage devices and respective PLUNs. The storage profile includes one or more attributes for characterizing storage used in storage area network selected from a set of attributes including: maximum transfer rate, access time, storage reliability, RAID level, single or multiple connectivity, storage redundancy limit, long-term transfer rate, last-byte latency, availability, reliability and correctness violations. These characteristics in the request assist the heuristics of the present invention in filtering through different physical storage devices used to ultimately create a VLUN for the host. For example, a RAID level specified in the storage profile may cause the heuristics to use PLUNs from RAID devices to construct the VLUN ultimately delivered to the host.

Once the request is made, the controller identifies a storage device pool of storage devices using a storage device candidate strategy and the storage profile (504). Storage devices not meeting the storage profile are not considered as candidates for the provisioning. For example, a storage profile requiring storage devices with multiple communication paths would eliminate all storage devices offering single communication path technology despite the amount of provisionable storage available on the particular storage device.

In addition, the devices also must substantially meet the requirements of a storage device candidate selection strategy (504). In one implementation, the storage candidate device strategy selects storage devices that substantially match the storage profile provided with the request. To initially qualify for the storage pool of storage devices, each storage device nominated as a candidate under this strategy has at least one media unit meeting the characteristics associated with the storage profile. For example, a storage device with high reliability and multiple communication paths would match a storage profile specifying these characteristics and potentially become a candidate. Determining the amount of storage available for provisioning from this storage device candidate is deferred until later to reduce processing complications and time delay.

Using heuristics of the present invention, further limitations on the storage devices are applied in addition to the storage profile to facilitate more rapid selection of a potential storage device solution. The storage candidate device strategy in one implementation orders the storage devices from the storage pool in a sequence for selecting the most appropriate storage device or devices. For example, storage devices candidates in the storage device pool can be sequenced according to a decreasing provisionable storage amount, a least recently used (LRU) or "round-robin" type order, a least cost usage order or a specified order of storage devices made by the host. Each of these different candidate strategies are applied to more rapidly converge on an optimal storage device selection for provisioning the requested storage amount more rapidly than conventional brute force approaches. Further details on each approach are described in further detail later herein.

The storage pool is then processed using a media unit provisioning strategy based upon the type of storage configuration specified in storage request (506). In one implementation, media unit provisioning strategies including taking a first solution of media units that meets the storage request, selecting a least costly media unit solution from multiple requests and even generating all media unit permutations that meet the storage request and allowing the host or operator to decide. For example, taking a first solution of media units could be an efficient strategy for provisioning if there is likely only one provisioning solution and looking for subsequent solutions would incur unnecessary further processing.

A solution generator is then used to generate media unit solutions using the selected media unit provisioning strategy for each storage device in storage pool sequence (508). Different solutions are generated that attempt to meet the storage requirements requested with different media unit combinations. Storage requirements can be met with a media unit providing the requested amount, close to the requested amount, more than the requested amount or combinations of media units that also meet the requested amount. Time expended generating these solutions depends on the media unit provisioning strategy being used. Taking a first solution of media units would suggest a provisioning as soon as it is discovered while a least cost media unit provisioning would attempt to discover all the possible provisioning solutions and order in terms of the least costly.

Implementations of the present invention evaluate these solutions and determine if an acceptable provisioning strategy solution for the requested storage configuration is produced (510). If a solution for the requested storage configuration requires only one media unit (516), the provisioning strategy solution is realized by actually provisioning storage (518) from one or more media units of the corresponding storage device. Alternatively, if additional media units are part of the storage configuration request then the storage device and media units from the provisioning strategy are removed from consideration in subsequent provisioning and the process repeats (504-516).

If a provisioning strategy for the requested storage configuration is not produced, implementations of the present invention determines if combining the largest media units from different provisioning strategies can solve the storage configuration request. In one implementation, the largest media units in each of the storage devices are identified and sorted in decreasing size order and combined to solve the storage configuration and size request. A vector or array is kept of the largest media units associated with each storage device as they are evaluated. To save processing cycles, this information is usually collected as each storage device is considered in the various operations described above. A concatenation operation is performed on the media units once the proper combination of media units is determined. When no possible provisioning is possible, implementations of the present invention indicates that the request for media unit storage fails (514).

Figure 6:
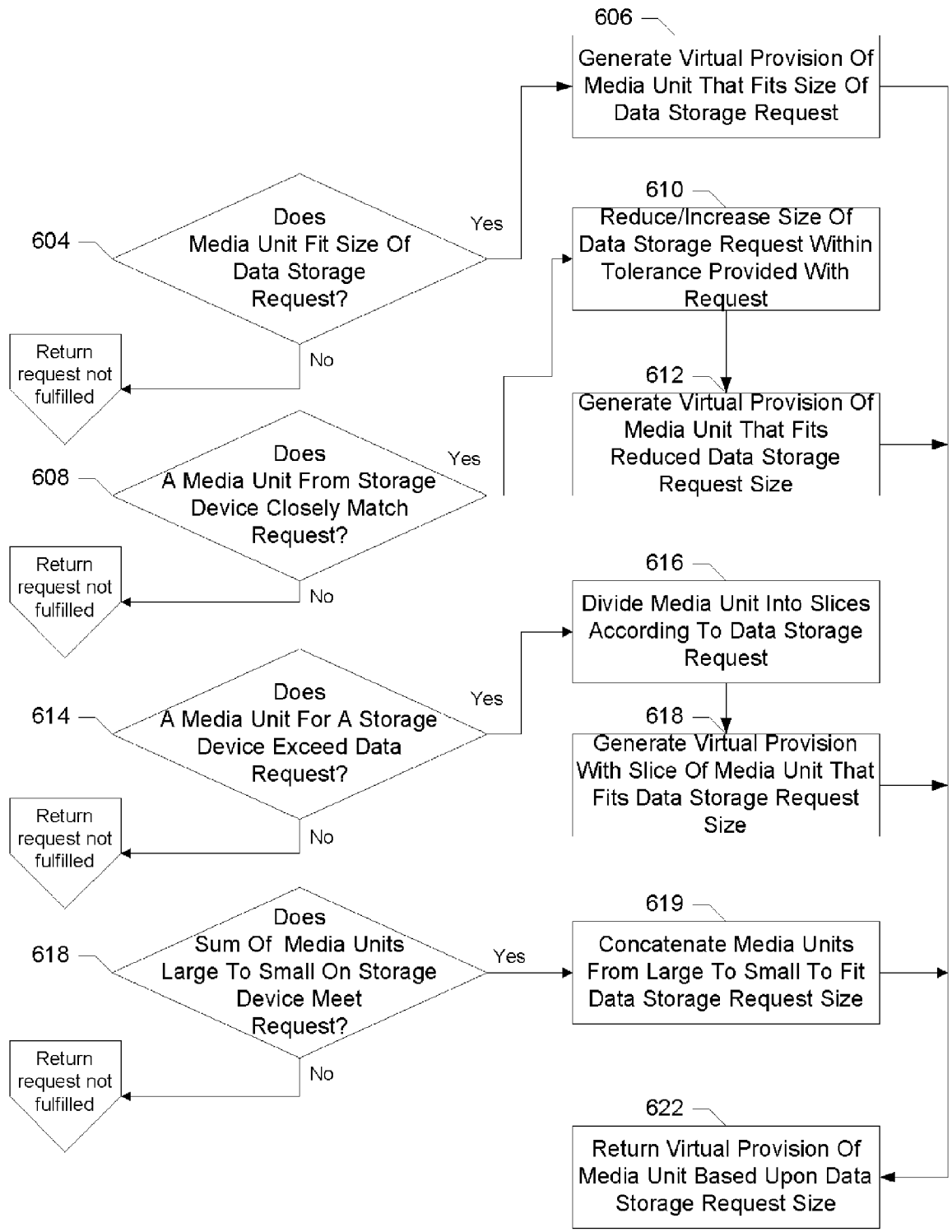
FIG. 6 is a flowchart diagram illustrating a sequence of media unit selection strategies implemented in accordance with one implementation of the present invention.

Implementations of the present invention may use one or more different approaches to determine if a media unit fits a storage request. Accordingly, FIG. 6 is a block diagram and flowchart of strategies to determine if a single media unit fulfills a storage size request as referenced and utilized in steps 508 and 510 of FIG. 5. These different media unit device selection strategies could be implemented in an object oriented programming language using different classes and methods. An object oriented solution also would allow modular addition or removal of strategies as seen fit when implementing aspects of the present invention.

One media unit selection strategy determines if a media unit fits the size of the data storage request (604). Single media unit solutions may be preferred by certain provisioning strategies to simplify the provisioning process. In some cases, it also may reduce the chance that multiple data sets will be affected by a faulty storage device or media. If a media unit is selected using this strategy, implementations of the present invention generate a virtual provision of the media unit that fits the size of data storage request (606) and returns a virtual provision of the media unit (622).

Another, media unit selection strategy determines if a media unit closely matches the storage amount request (608). In this device selection strategy, the storage amount request can be increased or decreased up to a predetermined specified amount in the request to find an available media unit. For example, a storage request for 5 Gigabytes +/−500 Megabytes could be satisfied by a media unit with only 4.5 Gigabytes of provisional storage as the storage request could be reduced to meet the storage capacity of the storage device. If a media unit is selected using this strategy, implementations of the present invention reduce or increase the size of data storage request within the tolerance provided with the request (610), generate a virtual provision of the media unit that fits size of data storage request (612) and returns a virtual provision of the media unit to the requesting host (622).

In yet another media unit selection strategy, a determination is made whether a media unit exceeds the storage requirement for the data request (614). This media unit selection strategy uses the media unit for the provisioning but first divides the media unit into slices in accordance with the data storage request (616), generate a virtual provision of the media unit that fits size of data storage request (618) and returns a virtual provision of the media unit to the requesting host (622). For example, a 4.5 Gigabyte storage amount request from a 100 Gigabyte media unit would be better used in the storage network by first dividing the 100 Gigabyte media into a 4.5 Gigabyte slice and a 95.5 Gigabyte slice.

Another media unit selection strategy determines if a sum of media units from large to small in the storage device can meet the request (618). If several media units can meet the request together then a combination of media units are concatenated together from large to small to fit the data storage request size (619) returning a virtual provision of the media units according to the requested storage size (622).

Of course, if none of the above media unit selection strategies produce or select a media unit then implementations of the present invention indicate the storage device is unable to fulfill the data storage request using the selected strategy. The media unit provisioning strategy may decide to selected a different media unit selection strategy or indicate that the storage cannot be allocated using the particular media unit provisioning strategy. For example, a provisioning strategy taking a first solution may first use a media unit fit strategy (604) and subsequently try a sum of media units large to small strategy (618) to identify a media unit solution to the storage size request. Other combinations are also possible and depend on the particular information in the storage request from the host.

Figure 7A:
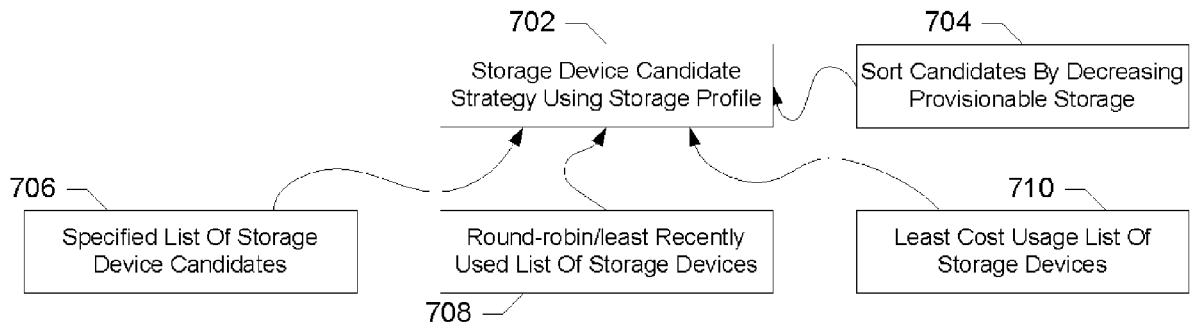
FIG. 7A provides a block diagram of a hierarchy for organizing storage device candidate strategies in accordance with one implementation of the present invention.

FIG. 7A provides a block diagram of a hierarchy for organizing storage device candidate strategies in accordance with one implementation of the present invention. These storage device candidate strategies are described above with respect to step 504 in FIG. 5. In this example, each storage device candidate strategies 702 identifies storage devices that have at least one media unit that meets the storage profile provided by the host. As previously described, additional constraints are added to improve the results of the heuristics in selection and timing. In this example, these further constraints are used to order the storage devices candidates in decreasing provisionable storage amounts 704, using a specified list of storage device candidates from the host 706, sorting according to least recently used/a round robin usage of storage devices 708 and a least cost usage of storage devices 710. Sorting the storage device candidates in decreasing provisionable storage amounts 704 provides the storage devices with the largest provisionable amounts first. This increases the likelihood that a particular storage request is met quickly as the largest storage devices are capable of handling a wide range of storage requests. The specified list of storage device candidates from the host 706 enables a host to provide a particular list of desirable storage devices. Some of the storage devices specified on the list may not be considered if they do not have at least one media unit meeting the storage profile as required by the over storage device candidate strategy 702. A least recently used (LRU) or round robin list of storage devices spreads the provisioning of storage to a wider range of storage devices. This avoids using the same storage device for provisioning and therefore may potentially reduce the impact of a single device failure when many are available. While these are useful examples, many other storage device selection and sorting operations are possible and depend on the particular provisioning goals.

Figure 7B:
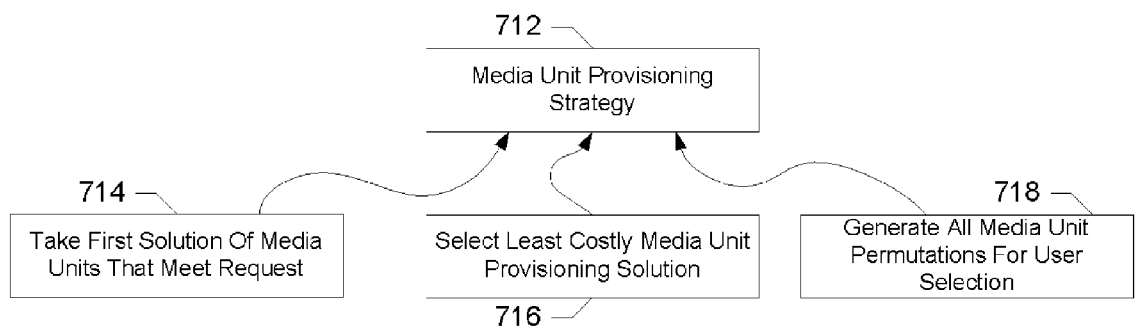
FIG. 7B provides a block diagram of a hierarchy for organizing media unit provisioning strategies in accordance with one implementation of the present invention.

FIG. 7B provides a block diagram of a hierarchy for organizing media unit provisioning strategies in accordance with one implementation of the present invention. These media unit provisioning strategies were described previously in conjunction with step 506 and 508 in FIG. 5. In this example, an overall media unit provisioning strategy 712 further includes a take first media unit provisioning 714, a least cost media unit provisioning 716 and various permutations of media unit provisioning 718 for performing experiments and "what if" scenarios.

As previously described, take first media unit provisioning 714 provisions storage from the first media units capable of provisioning the requested storage amount. The heuristic implementing take first storage device provisioning 714 saves time by selecting the first available solution that meets a storage profile rather than evaluating many or all other possibilities. Least cost media unit provisioning 716 takes a different approach and associates a cost with provisioning one media unit over another media unit and selects the least costly on this basis. The last example illustrated in FIG. 7B provides various permutations for media unit provisioning 718 and is used to increase the number of possible media unit provisions, perform "what if" scenarios and generally experiment with different solutions. Unlike the other strategies, this last media unit provisioning strategy may utilize more time due to the large number of possibilities it would need to explore and suggest.

Figure 8:
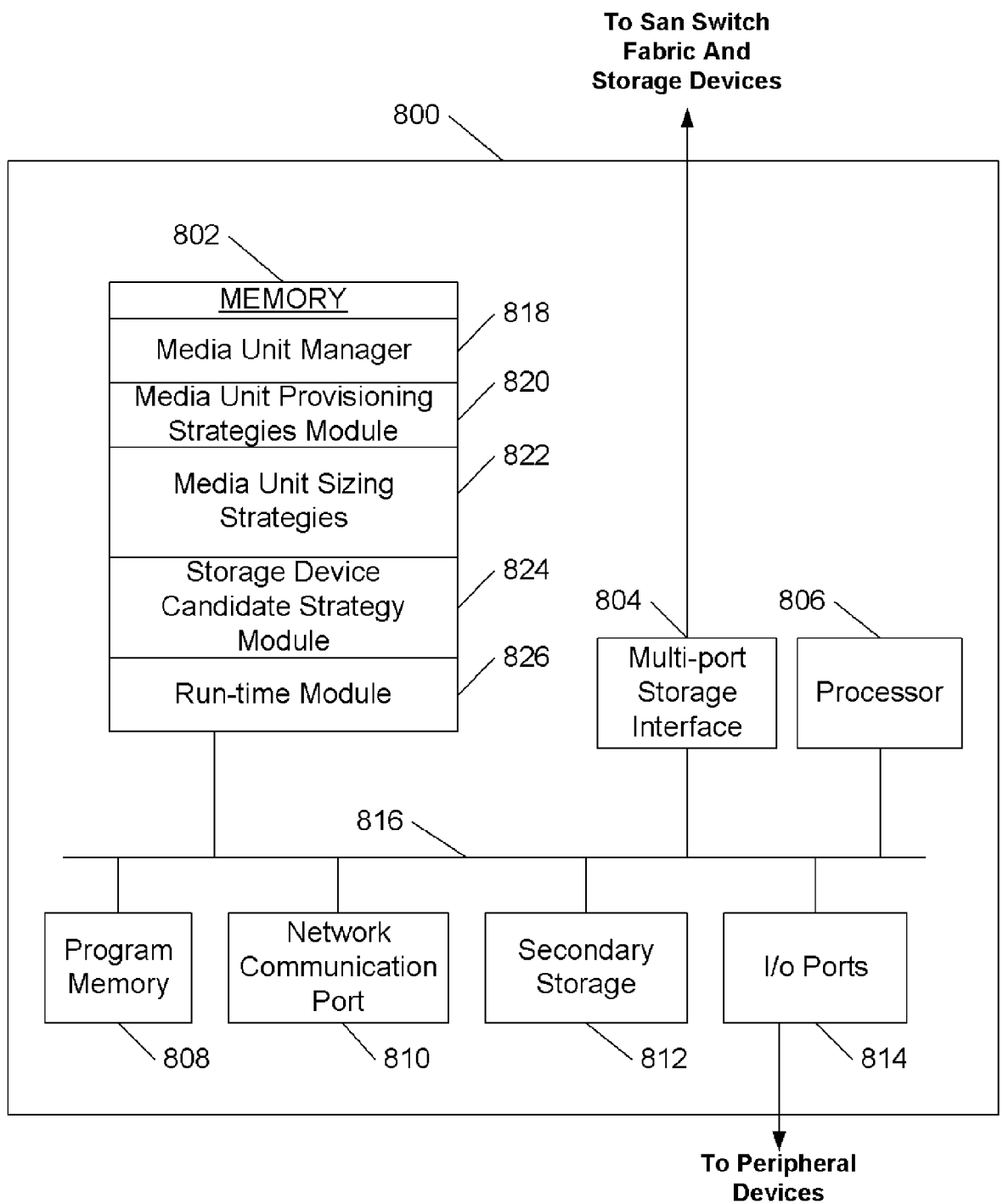
FIG. 8 provides one implementation of the present invention as it would be implemented in a computer device or system.

FIG. 8 provides one implementation of the present invention as it would be implemented in a computer device or system. In this example, system 800 includes a memory 802, typically random access memory (RAM), a multiport storage interface 804, a processor 806, a program memory 808 (for example, a programmable read-only memory (ROM) such as a flash ROM), a network communication port 810 as an alternate communication path, a secondary storage 812, and I/O ports 84 operatively coupled together over interconnect 816. The system 800 can be preprogrammed, in ROM, for example using a microcode or it can be programmed (and reprogrammed) by loading a program from another source (for example, from a floppy disk a CD-ROM, or another computer) and preferably operates using real-time operating system constraints.

Memory 802 includes various components useful in implementing aspects of the present invention. These components include a media unit manager 818, a media device provisioning strategies 820, a media unit sizing strategies module 822, a storage device candidate module 824, all managed using a run-time module 826.

Media unit manager 818 is typically included with each storage virtualization controller and, as previously described, translates information and data flowing between VLUNs and PLUNs. Media unit provisioning strategies module 820 implements strategies for provisioning media units in accordance with implementations of the present invention. Example strategies include a take first media unit strategy, a least cost media unit strategy and generate all permutations strategy as previously described. Media unit sizing strategies 822 encompass a set of approaches to fitting a media unit to a particular storage request. As also previously described, a media unit sizing strategies include a media unit fit strategy, a media unit within a tolerance strategy, a media unit exceeding the requested size and a concatenation of largest to smallest media units for a given storage device strategy. Storage device candidate strategy module 824 implements strategies for selecting storage devices to a storage device pool and includes a sort by provisionable storage strategy, a sort done according to a specified list of storage devices, a least recently used/round-robin storage device strategy and a least cost list of storage devices.

In general, implementations of the invention can be implemented in digital electronic circuitry, or in computer hardware, firmware, software, or in combinations of them. Apparatus of the invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, the processor receives instructions and data from a read only memory and/or a random access memory. Also, a computer will include one or more secondary storage or mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs (application specific integrated circuits).

While specific embodiments have been described herein for purposes of illustration, various modifications may be made without departing from the spirit and scope of the invention. For example, implementations of the present invention are described as being used by SAN system using distributed storage virtualization controllers however it can also be also be used for provisioning storage on other distributed systems including distributed network controllers, distributed computing controllers, and other distributed computing products and environments. Accordingly, the invention is not limited to the above-described implementations, but instead is defined by the appended claims in light of their full scope of equivalents. From the foregoing it will be appreciated that the storage provisioning arrangement, system, and methods provided by the present invention represent a significant advance in the art. Although several specific embodiments of the invention have been described and illustrated, the invention is not limited to the specific methods, forms, or arrangements of parts so described and illustrated. For example, the invention is not limited to storage systems that use SCSI storage devices, nor to networks utilizing fibre channel protocol. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Unless otherwise specified, steps of a method claim need not be performed in the order specified. The invention is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method of provisioning storage from a storage area network, comprising:
   receiving a request for a storage size and storage configuration from a storage area network according to a storage profile;
   identifying a storage device pool of storage devices;
   selecting a media unit provisioning strategy based upon the type of storage configuration specified in the storage request;
   generating media unit solutions using the media unit provisioning strategy; and
   provisioning a media unit solution from the identified storage device pool of storage devices.

2. The method of claim 1 wherein the storage device pool of storage devices are identified according to a storage device candidate strategy.

3. The method of claim 1 wherein provisioning the media unit solution further includes determining if the media unit provisioning strategy produced a solution for the requested storage configuration.

4. The method of claim 2 wherein the storage device candidate strategy identifies a set of storage devices having at least one media unit that satisfies the storage profile.

5. The method of claim 4 wherein the storage device candidate strategy further includes sorting the storage device candidates in order of decreasing provisional storage amounts.

6. The method of claim 4 wherein the storage device candidate strategy further includes using a predetermined sequence of selected storage devices to identify and place the storage devices in a sequence.

7. The method of claim 4 wherein the storage device candidate strategy further includes ordering the set of storage devices in a least-recently-used sequence.

8. The method of claim 4 wherein the storage device candidate strategy further includes ordering the set of storage devices according to a least-cost sequence.

9. The method of claim 1 wherein the media unit provisioning strategy for provisioning media unit solutions from a storage device is selected from a set of media unit provisioning strategies including determining if a media unit provides the requested storage size solution, a media unit closely matches the requested storage size solution, a media unit exceeds the requested storage size solution and can be sliced and a concatenation of media units in the storage device from large to small exists that satisfies the storage size request.

10. A computer program product for provisioning storage from a storage area network, tangibly stored on a computer-readable medium, comprising instructions operable to cause a programmable processor to:
    receive a request for a storage size and storage configuration from a storage area network according to a storage profile;
    identify a storage device pool of storage devices;
    select a media unit provisioning strategy based upon the type of storage configuration specified in the storage request;
    generate media unit solutions using the media unit provisioning strategy; and
    provision a media unit solution from the identified storage device pool of storage devices.

11. The computer program product of claim 10 wherein the storage device pool of storage devices are identified according to a storage device candidate strategy.

12. The computer program product of claim 10 wherein the media unit solutions generated further depends on the sequence of storage devices in the storage pool.

13. The computer program product of claim 10 wherein provisioning the media unit solution further includes determining if the media unit provisioning strategy produced a solution for the requested storage configuration.

14. The computer program product of claim 11 wherein the storage device candidate strategy identifies a set of storage devices having at least one media unit that satisfies the storage profile.

15. The computer program product of claim 14 wherein the storage device candidate strategy further includes sorting the storage device candidates in order of decreasing provisional storage amounts.

16. The computer program product of claim 14 wherein the storage device candidate strategy further includes using a predetermined sequence of selected storage devices to identify and place the storage devices in a sequence.

17. The computer program product of claim 14 wherein the storage device candidate strategy further includes ordering the set of storage devices in a least-recently-used sequence.

18. The computer program product of claim 14 wherein the storage device candidate strategy further includes ordering the set of storage devices according to a least-cost sequence.

19. The computer program product of claim 10 wherein the media unit provisioning strategy for provisioning media unit solutions from a storage device is selected from a set of media unit provisioning strategies including determining if a media unit provides the requested storage size solution, a media unit closely matches the requested storage size solution, a media unit exceeds the requested storage size solution and can be sliced and a concatenation of media units in the storage device from large to small exists that satisfies the storage size request.

20. An apparatus for provisioning storage from a storage area network, comprising:
a processor capable of executing instructions;
a memory containing instructions when executed on the processor that receive a request for a storage size and storage configuration from a storage area network according to a storage profile, identify a storage device pool of storage devices, select a media unit provisioning strategy based upon the type of storage configuration specified in the storage request, generate media unit solutions using the media unit provisioning strategy and provision a media unit solution from the identified storage device pool of storage devices.

21. The apparatus of claim 20 wherein the storage device pool of storage devices are identified according to a storage device candidate strategy.

22. The apparatus of claim 20 wherein provisioning the media unit solution further includes determining if the media unit provisioning strategy produced a solution for the requested storage configuration.

23. The apparatus of claim 21 wherein the storage device candidate strategy identifies a set of storage devices having at least one media unit that satisfies the storage profile.

24. The apparatus of claim 21 wherein the storage device candidate strategy further includes sorting the storage device candidates in order of decreasing provisional storage amounts.

25. The apparatus of claim 21 wherein the storage device candidate strategy further includes using a predetermined sequence of selected storage devices to identify and place the storage devices in a sequence.

26. The apparatus of claim 21 wherein the storage device candidate strategy further includes ordering the set of storage devices in a least-recently-used sequence.

27. The apparatus of claim 20 wherein the media unit provisioning strategy for provisioning media unit solutions from a storage device is selected from a set of media unit provisioning strategies including determining if a media unit provides the requested storage size solution, a media unit closely matches the requested storage size solution, a media unit exceeds the requested storage size solution and can be sliced and a concatenation of media units in the storage device from large to small exists that satisfies the storage size request.

* * * * *